United States Patent
Di Pietro et al.

(10) Patent No.: US 9,338,075 B2
(45) Date of Patent: May 10, 2016

(54) METHOD FOR MONITORING TRAFFIC IN A NETWORK AND A NETWORK

(75) Inventors: Andrea Di Pietro, Heidelberg (DE); Felipe Huici, Dossenheim (DE); Saverio Niccolini, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 177 days.

(21) Appl. No.: 13/500,653

(22) PCT Filed: Oct. 9, 2009

(86) PCT No.: PCT/EP2009/007250
§ 371 (c)(1),
(2), (4) Date: Apr. 6, 2012

(87) PCT Pub. No.: WO2011/042035
PCT Pub. Date: Apr. 14, 2011

(65) Prior Publication Data
US 2012/0198062 A1    Aug. 2, 2012

(51) Int. Cl.
*G06F 15/173*    (2006.01)
*H04L 12/26*    (2006.01)

(52) U.S. Cl.
CPC ............. *H04L 43/12* (2013.01); *H04L 43/026* (2013.01)

(58) Field of Classification Search
CPC ......... H04L 45/04; H04L 45/42; H04L 45/44; H04L 45/38
USPC .................................. 709/224; 370/253, 235
See application file for complete search history.

(56) References Cited

U.S. PATENT DOCUMENTS

| | | | |
|---|---|---|---|
| 6,108,782 A | 8/2000 | Fletcher et al. | |
| 6,515,968 B1 * | 2/2003 | Combar et al. | 370/252 |
| 6,871,284 B2 * | 3/2005 | Cooper et al. | 726/1 |
| 7,401,132 B1 * | 7/2008 | Krumel | H04L 29/06 370/351 |
| 7,496,661 B1 * | 2/2009 | Morford | H04L 41/5025 709/224 |
| 7,574,499 B1 | 8/2009 | Swildens et al. | |
| 7,843,843 B1 * | 11/2010 | Papp, III | H04L 12/26 370/252 |
| 7,849,502 B1 * | 12/2010 | Bloch et al. | 726/11 |
| 7,860,965 B1 * | 12/2010 | Bain | H04L 12/2602 709/223 |
| 7,917,647 B2 * | 3/2011 | Cooper et al. | 709/233 |

(Continued)

FOREIGN PATENT DOCUMENTS

JP    2008-219383 A    9/2008
WO    2009-004701 A1   1/2009

OTHER PUBLICATIONS

International Search Report dated Mar. 11, 2010, corresponding to PCT/EP2009/007250.

(Continued)

*Primary Examiner* — Jason Recek
*Assistant Examiner* — Mark A Scott
(74) *Attorney, Agent, or Firm* — Young & Thompson

(57) ABSTRACT

For providing a simple monitoring mechanism with reduced resource and performance requirements a method for monitoring traffic in a network is claimed, wherein a monitoring activity of at least two monitoring probes of the network is coordinated by a coordinating element, wherein at least two nodes of the network are able to operate as coordinating elements and wherein the responsibility for coordinating the monitoring activity of the monitoring probes is split between the nodes according to a compressed representation of flow parameter keys. Further, an according network is described, preferably for carrying out the above mentioned method.

16 Claims, 1 Drawing Sheet

(56) References Cited

U.S. PATENT DOCUMENTS

| | | | |
|---|---|---|---|
| 8,260,739 B1* | 9/2012 | Pelletier | G05B 15/02 700/2 |
| 2003/0187974 A1* | 10/2003 | Burbeck | H04L 12/1863 709/224 |
| 2004/0199793 A1* | 10/2004 | Wilken | H04L 12/2602 726/22 |
| 2004/0261030 A1* | 12/2004 | Nazzal | H04L 63/14 715/738 |
| 2006/0072451 A1* | 4/2006 | Ross | 370/229 |
| 2006/0089985 A1* | 4/2006 | Poletto | H04L 41/0631 709/224 |
| 2006/0168304 A1* | 7/2006 | Bauer et al. | 709/232 |
| 2007/0028002 A1* | 2/2007 | McCanne | 709/238 |
| 2008/0059631 A1* | 3/2008 | Bergstrom et al. | 709/224 |
| 2008/0177833 A1* | 7/2008 | Gu et al. | 709/204 |
| 2008/0247331 A1* | 10/2008 | Becker et al. | 370/253 |
| 2008/0316922 A1* | 12/2008 | Riddle | H04L 41/0893 370/230 |
| 2009/0019149 A1* | 1/2009 | Cohen et al. | 709/224 |
| 2009/0019165 A1* | 1/2009 | Li | H04L 1/0002 709/227 |
| 2009/0097406 A1* | 4/2009 | Nilakantan et al. | 370/235 |
| 2009/0106364 A1* | 4/2009 | Rissanen | 709/205 |
| 2009/0222924 A1* | 9/2009 | Droz et al. | 726/24 |
| 2009/0252033 A1* | 10/2009 | Ramakrishnan | H04L 12/18 370/228 |
| 2009/0276522 A1* | 11/2009 | Seidel | H04L 43/12 709/224 |
| 2009/0323537 A1* | 12/2009 | Yamamoto et al. | 370/242 |
| 2010/0023726 A1* | 1/2010 | Aviles | 711/216 |
| 2010/0100768 A1 | 4/2010 | Yamamoto et al. | |
| 2010/0185760 A1* | 7/2010 | Nakahira | 709/224 |
| 2010/0208590 A1* | 8/2010 | Dolganow | H04L 43/026 370/235 |
| 2010/0226278 A1* | 9/2010 | Borsos et al. | 370/253 |
| 2010/0271964 A1* | 10/2010 | Akhter | H04L 43/0817 370/252 |
| 2010/0332579 A1* | 12/2010 | Sengupta et al. | 709/201 |
| 2011/0022812 A1* | 1/2011 | van der Linden | G06F 9/5077 711/163 |
| 2011/0080886 A1* | 4/2011 | Chandrachood | H04L 47/14 370/329 |

OTHER PUBLICATIONS

Sekar, et al.; "CSAMP: a system for network-wide flow monitoring"; Proceedings of the 5th USENIX Symposium on Networked Systems and Design and Implementation; Apr. 16, 2008; pp. 1-14.

Sharma, et al.; "Scalable Coordination Techniques for Distributed Network Monitoring"; Masters Thesis; Jan. 1, 2004.

Japanese Office Action, dated Jul. 25, 2013, from corresponding JP application.

* cited by examiner

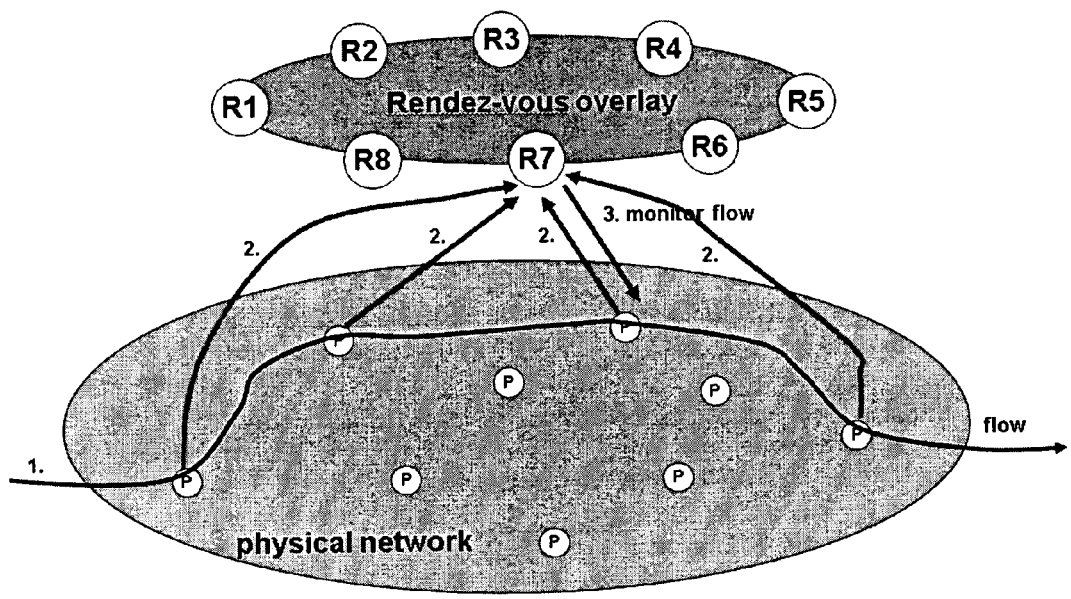

US 9,338,075 B2

METHOD FOR MONITORING TRAFFIC IN A NETWORK AND A NETWORK

BACKGROUND OF THE INVENTION

1. Field of the Invention

The present invention relates to a method for monitoring traffic in a network, wherein a monitoring activity of at least two monitoring probes of the network is coordinated by a coordinating means. Further, the present invention relates to a network wherein for monitoring traffic in the network a monitoring activity of at least two monitoring probes of the network is coordinated by a coordinating means.

2. Description of the Related Art

Monitoring is crucial both to the correct operation of a network and to the services that run on it. Operators perform monitoring for various purposes, including traffic engineering, quality of service, security and detection of faults and mis-configurations. Traffic relevant to these applications tends to flow through several points in the network, and so a distributed monitoring architecture is needed in order to track it.

Unfortunately, monitoring traffic in real-time and in a distributed way presents a range of difficult issues. The first of these is scalability: the volume of traffic to be monitored is rapidly growing, with reports stating that the annual global IP traffic volume will exceed half a zettabyte by 2012 and will nearly double every two years; this growth puts serious stress on any monitoring infrastructure. Flow-based monitoring helps to deal with this problem by operating at a coarser granularity while retaining the required resolution for fulfilling operators' needs. In addition, flow monitoring avoids the bias of packet sampling approaches against small flows, an important feature for security applications.

Monitoring such traffic requires a distributed infrastructure that allows the burden of the monitoring task to be shared among a wide set of probes scattered throughout the network. However, a coordination infrastructure for this set of probes is needed: in particular, since each traffic flow is likely to go through several probes at the same time, it is necessary to ensure that only one of these monitors and exports data about the flow. This necessity stems both from performance reasons, i.e. monitoring the same flow several times and exporting the associated reports wastes valuable resources, and accuracy reasons, i.e. accounting for the same flow several times can cause monitoring applications to arrive at wrong aggregated results.

Most of the proposed approaches for coordinating the activities of multiple probes are based on a centralized entity that, after collecting all of the necessary information about the traffic and the resources available on each probe computes an optimized configuration. One of the most representative examples of this kind of solution is Csamp, which assumes the coordination point to have the knowledge of the traffic matrix and the routing scheme, as well as the probes to be able to mark each packet with an Origin-Destination identifier. While this last assumption has been addressed by a more recent version of Csamp, this improvement comes at the cost of having to deal with a higher flow granularity and, therefore, generally yields a sub-optimal solution.

Besides the high-level of churn resulting from the updates, this centralized location presents scalability problems and a single point of failure. A refined version of Csamp has been proposed which addresses this problem but at the cost of a sub-optimal resource allocation. Csamp is described within "CSAMP: a system for network-wide flow monitoring". Sekar, V., Reiter, M. K., Willinger, W., Zhang, H., Kompella, R. R., and Andersen, D. G. 2008. In Proceedings of the 5th USENIX Symposium on Networked Systems Design and Implementation (San Francisco, Calif., Apr. 16-18, 2008)".

A single coordination point approach is not likely to scale up to large monitoring systems and makes the system scarcely resilient to failures. Furthermore, retrieving the traffic matrices and the routing state is not always possible, especially in the case of inter-domain monitoring, since operators are hardly willing to disclose such information to third parties. Furthermore, in order to issue a new monitoring configuration upon change of the network conditions, a centralized approach has to gather measurement data first, and then to compute a new, optimal solution; this may involve considerable latency, possibly causing inconsistent measurements.

Another solution uses probabilistic data structures to disseminate information about which probes are currently monitoring which flows. Such a solution is obtainable from "Scalable Coordination Techniques for Distributed Network Monitoring". Sharma, M. and Byers, J. In Proceedings of the 6th Conference on Active and Passive Measurement (PAM 2005)" and basically involves using an epidemic algorithm in order to broadcast to every monitoring node a probabilistic data structure summarizing all of the flows which are currently being monitored. Such a model involves a high overhead in terms of exchanged traffic and does not scale well. Additionally, since probabilistic summaries usually allow for false positives, a certain number of flows is likely to escape monitoring. Unfortunately, the approach uses gossiping protocols, so does not scale to larger networks. In addition, a small fraction of flows may be monitored more than once, which may not be acceptable depending on the requirements of the network operator.

Further, from "Coordinated Sampling sans Origin-Destination Identifiers: Algorithms, Analysis, and Evaluation" Vyas Sekar, Anupam Gupta, Michael K Reiter, Hui Zhang Technical Report, CMU-CS-09-104 another method for monitoring traffic in a network is obtainable.

SUMMARY OF THE INVENTION

It is an object of the present invention to improve and further develop a method for monitoring traffic in a network for providing a simple monitoring mechanism with reduced resource and performance requirements. It is a further object of the present invention to provide an according network, preferably for carrying out the above method.

In accordance with the invention, the aforementioned object is accomplished by a method and a network. The method is characterized in that at least two nodes of the network are able to operate as coordinating means and that the responsibility for coordinating the monitoring activity of the monitoring probes is split between the nodes according to a compressed representation of flow parameter keys.

The network is characterized in that at least two nodes of the network are able to operate as coordinating means and that the responsibility for coordinating the monitoring activity of the monitoring probes is split between the nodes according to a compressed representation of flow parameter keys.

According to the invention it has been recognized that it is possible to allow the coordination of multiple measurement points with no need for a centralized coordination unit. Instead of a centralized coordination unit at least two nodes of the network are able to operate as coordinating means. Particularly, the responsibility for coordinating the monitoring activity of the monitoring probes is splitted between the nodes according to a compressed representation of flow parameter keys. With such a splitting between the nodes a more local coordination of the monitoring mechanism is possible thereby reducing monitoring traffic which is necessary in the case of a centralized coordination unit.

With the present invention a simple monitoring mechanism with reduced resource and performance requirements is provided.

The present invention provides a solution to allow the coordination of multiple measurement probes or points with no need for a centralized coordination point. Preferably, the responsibility of monitoring a specific traffic flow is assigned to a single probe, so that all flows going through probes are monitored, but only once. Thus, no duplicate reports or messages associated with the same flow are exported by the probes, unless explicitly required.

Within a preferred embodiment of the invention content based addressing could be used within the network for reliable performance of the network. Further, transparent handling of node failures and new node joins could be used within the network.

Preferably, the nodes could belong to a peer-to-peer system. In this case the monitoring coordination infrastructure leverages a peer-to-peer network of nodes, which share the responsibility for coordinating the measurement or monitoring task.

Preferably, also the probes could belong to a peer-to-peer system or to the same peer-to-peer system. Otherwise, the probes could be connected to the peer-to-peer system. Thus, an according network could encompass both monitoring probes and nodes which only fulfill coordination tasks.

No particular peer-to-peer system or technology is necessary within the present invention, but preferably any protocol could be used that implements content based addressing as in a Distributed Hash Table (DHT), for example, and transparent handling of node failures and new node joins.

Within a preferred embodiment of an inventive method for monitoring traffic in a network, upon detection of a new flow at least one probe computes the hash value of one or more certain fields of the flow identifying the flow. In other words, such a hash value could provide a compressed representation of flow parameter keys.

Preferably, the hash could be the flow 5-tuple consisting of IP source and destination addresses, protocol type, and source and destination ports. Thus, a compressed representation of a flow is simply obtainable.

After having computed the hash value, the probe could perform a content-based lookup of the computed hash value for obtaining the address of the responsible node which will be responsible for coordinating the monitoring of the flow. After having obtained the address of the responsible node, the probe could send a message to the responsible node including definable data types of the flow and/or a description of the flow. Such a message could further comprise a report or data with regard to the state or availability of probe and/or monitoring resources. The data could comprise available memory, bandwidth, CPU cycles, CPU utilization and/or a timestamp. In case the monitoring activity requires the knowledge of the ingress and egress probes observing the flow, such a timestamp could be included in the message, thus allowing the node to know the last and the first measurement points or probes the flow passes through.

After having received the message from the probe or from more than one probe, the responsible node assigns the responsibility for monitoring the flow to a single suitable probe. Such a decision for assignment by the responsible node could be based on the report and/or data and/or on a local information and/or on a user-specified policy. Since the decision could be made based only on local information, a globally optimal choice can not be achieved. However, different local policies could be adopted.

After making the decision, the node just needs to notify the selected probe that it should begin monitoring the flow.

Within a further preferred embodiment the message could comprise data types and/or a description of more than one detected flow. Thus, one probe could operate as monitoring point for more than one flow.

The present invention allows balancing the load of the monitoring task among different probes according to user-defined policies; these may take into account metrics such as the available resources on each probe, e.g., CPU utilization, memory usage, etc. The solution achieves the mentioned results by preferably leveraging existing peer-to-peer technology, specially with respect to the following features: content-based addressing, fault resilience and load balancing.

The present invention provides a distributed solution to coordinate a set of probes in order to guarantee that each flow in the network is monitored by exactly one measurement point, a fault-resilient and self-adapting measurement coordination solution with no single point of failure and a framework that allows allocating the measurement tasks according to locally-optimum criteria and by taking resource availability into account.

According to the present invention, there is provided a scalable and fault resilience measurement coordination solution that allows multiple measurement points or probes to monitor all flows going through probes only once. The invention is providing an optimization of the usage of the monitoring resources by avoiding the export and the generation of redundant flow reports, thus allowing the monitoring system to scale to higher traffic volumes and larger networks. On the other hand the consistency of the monitoring data is ensured. Several known applications, e.g. those based on probabilistic data summaries or simply on aggregate counters, are not able to distinguish among multiple measurements of the same flow. In the presence of duplicate measurements, they could end up accounting several times for the same event, thus issuing a wrong result. Let us just consider a scan detector which looks for source addresses sending packets to a large variety of hosts and ports: if the same packets are measured multiple times, a regular traffic source could be labeled as a scanner and therefore be blacklisted or blocked.

There are many advantages of the present invention compared to current state of the art. With respect to centralized coordination solutions a quicker response is guaranteed, as no massive calculation of new monitoring configuration has to be made upon changes in the connection state. Further, there is no single point of failure and the scalability is much higher and the infrastructure can be easily extended by dynamically adding more nodes to the peer-to-peer network. With respect to a distributed approach based on an epidemic protocol higher accuracy, less overhead and scalability are possible, as no probabilistic structure is involved, as there is no need for continues rebroadcast of new summaries and as epidemic protocols are avoided which are infamous for having serious scalability issues.

BRIEF DESCRIPTION OF THE DRAWING FIGURES

There are several ways how to design and further develop the teaching of the present invention in an advantageous way. To this end, it is to be referred to the following explanation of preferred examples of embodiments of the invention, illustrated by the drawing on the other hand. In connection with the explanation of preferred embodiments of the invention by the aid of the drawing, generally preferred embodiments and further developments of the teaching will be explained. In the drawings FIG. 1 is illustrating a preferred embodiment of a network structure according to the invention.

FIG. 1 is illustrating a preferred embodiment of a network structure according to the invention.

DETAILED DESCRIPTION OF THE INVENTION

According to a preferred embodiment the invention consists of a method for coordinating the activity of a large set of monitoring probes P in order to ensure that a traffic flow is monitored exactly once by a probe and, at the same time, to allocate the monitoring resources as optimally as possible based only on local decisions.

The monitoring coordination infrastructure leverages a peer-to-peer network of nodes R called Rendez-vous Points RPs which share the responsibility for coordinating the measurement task: such a network can encompass both monitoring probes P and nodes R which only fulfill coordination tasks. No particular peer-to-peer technology is assumed within the invention, but any protocol can be used that implements the following mechanisms: Content based addressing as in a Distributed Hash Table and transparent handling of node failures and new node joins.

FIG. 1 is showing a preferred embodiment of a network architecture according to the invention. There is shown a peer-to-peer Rendez-vous architecture, wherein the numbers denote the sequence of actions, R stands for Rendez-vous Point or node and P stands for probe. The lines from the probes P to the node R7 denote flow identifier information and the line from node R7 to probe P denotes a monitoring command.

The nodes R of the monitoring system are organized in a peer-to-peer system. The probes P do not need to belong to this peer-to-peer system but rather be able to have connection to it. However, within the preferred embodiment the probes P belong to the peer-to-peer system.

Whenever a new flow enters the network, each of the measurement probes P capturing it will compute the hash value of certain fields identifying the flow, such as the flow 5-tuple which consists of the source and destination IP addresses, protocol type and source and destination ports. Thus, the identifier of a key in the hash space of the DHT (Distributed Hash Table) can be obtained.

The probes P then perform a content-based lookup for that key, thus obtaining the address of the node R7 which will be responsible for coordinating the monitoring of that flow. The probes P then send a message to the relevant node R7 including the description of the flow and a report about the probe's currently available monitoring resources, e.g. memory, bandwidths and CPU cycles. These steps are denoted within FIG. 1 by step numbers 1 and 2.

Since the end-to-end delay of a flow trough a network is bounded, the respective RP or node R will receive the reports from all of the probes which are capable of monitoring the new flow in a bounded time slot. Based on the reported flow features and available resources, the RP or node R will select the responsible measurement point or probe P. Since the decision is made based only on local information, a globally optimal choice cannot be achieved. However, different local policies can be adopted: some techniques can be borrowed from the well-known field of memory allocation strategies. Examples of the possible policies are:

Best fit (select a probe which has just enough resources available for monitoring that flow)

Worst fit (select the probe which has the largest resources available for monitoring that flow)

First fit (select the first probe which has enough resources available for monitoring that flow)

After making the decision, the RP or node R just needs to notify the selected probe P that it should begin monitoring the flow. Note that, in case it is needed by the application, multiple measurement points or probes may be selected as well.

In addition, this scheme can also handle routing changes: if a flow's path changes, it is possible that it will no longer flow through its responsible probe. At this point, the flow will be going through the remaining, non-responsible and potentially through a set of new probes. The mechanism here is once again the same: new probes will report the arrival of a "new" flow to the RP or node R, and the RP or node R will choose a responsible probe from the set of previous and new probes. If, as the result of the change, the flow no longer goes through any probe, the RP or node R will classify it as terminated and remove any state associated with it both from probes and itself.

In other words, this solution can also handle monitoring handovers due to routing changes: if a flow stops going through the probe monitoring it—call it probe A—and starts flowing through a new one—probe B—, then B will notify the corresponding RP or node R about the fact that it is seeing an apparently new flow. The RP or node R will recognize this flow as a previously existing one, will confirm with A that it is no longer flowing through it, and then tell B to begin monitoring it, thus finishing the handover.

A simple optimization to the proposed scheme would be to bundle data associated with different flows in a single report, thus trading a reduction in the number of messages for timeliness. Other optimizations are also possible. Of course, such tuning choices have to be made according to the particular requirements of the deploying scenario.

Finally, it is worth noting that should a monitoring application explicitly want duplicate reports per flow—for instance, to measure statistics about a flow at the ingress and egress points of a network—, the scheme can support this. In other words, the system prevents undesired duplicate measurements/exports, but can support them so if explicitly needed.

According to the present invention the monitoring load on each probe can be distributed according to the current resource utilization and a simple, scalable and fault resilient infrastructure for preventing duplicate flow monitoring is provided.

Important aspects of the invention are:

The coordination infrastructure is scalable and fault resilient thanks to the underlying peer-to-peer technology. In case more resources are needed, new nodes can be added in a way that is transparent to the measurement infrastructure.

No additional information about the traffic matrix and the routing state are needed. Decisions are made locally based on the information sent by the probes.

The mechanisms are much simpler than other proposed approaches, putting much less performance requirements on all nodes involved; this allows for scalability as well as the ability to build these mechanisms using off-the-shelf, general-purpose hardware, i.e., PCs.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for monitoring traffic in a network, comprising:
   monitoring activity of at least two monitoring probes of the network coordinated by a coordinating means;
   operating at least two nodes of the network as the coordinating means, the at least two nodes belonging to a peer-to-peer system; and
   splitting a responsibility for coordinating the monitoring activity of the monitoring probes between the at least two nodes according to a compressed representation of flow parameter keys, wherein
   upon detection of a new flow at least one probe computes a hash value of one or more certain fields of the flow identifying the flow,
   the hash is the flow 5-tuple consisting of IP source and destination addresses, protocol type, and source and destination ports,
   after having computed the hash value, the at least one probe performs a content-based lookup of the computed hash value for obtaining the address of the responsible node which will be responsible for coordinating the monitoring of the flow, and after having obtained the address of the responsible node, the at least one probe sends a message to the responsible node including definable data types of the flow and/or a description of the flow,
   wherein transparent handling of node failures and new node joins is used within the network.

2. The method according to claim 1, wherein the responsibility of monitoring a specific traffic flow is assigned to a single probe.

3. The method according to claim 2, wherein content based addressing is used within the network.

4. The method according to claim 1, wherein content based addressing is used within the network.

5. The method according to claim 1, wherein the probes belong to the peer-to-peer system or to the same peer-to-peer system.

6. The method according to claim 1, wherein the probes are connected to the peer-to-peer system.

7. The method according to claim 1, wherein the message is further comprising a report or data with regard to the state or availability of probe and/or monitoring resources.

8. The method according to claim 7, wherein the data comprise available memory, bandwidth, CPU cycles, CPU utilization and/or a timestamp.

9. The method according to claim 1, wherein after having received the message from the probe or from more than one probe, the responsible node assigns the responsibility for monitoring the flow to a single suitable probe.

10. The method according to claim 9, wherein the decision for assignment by the responsible node is based on the report and/or data and/or on a local information and/or on a user-specified policy.

11. The method according to claim 1, wherein the message comprises data types and/or a description of more than one detected flow.

12. A network for carrying out the method according to claim 1, wherein for monitoring traffic in the network a monitoring activity of at least two monitoring probes of the network is coordinated by the coordinating means,
   the at least two nodes of the network are able to operate as the coordinating means and that the responsibility for coordinating the monitoring activity of the monitoring probes is split between the at least two nodes according to a compressed representation of flow parameter keys.

13. The method according to claim 1, wherein there is no centralized coordination point, responsibility of monitoring specific traffic is assigned to a single probe so that all flows going through the probes are monitored only once, and no duplicate reports or messages associated with the same flow are exported by the probes unless explicitly required.

14. A method for monitoring traffic in a network, comprising:
   monitoring and coordinating activity of at least two monitoring probes of the network;
   operating at least two nodes of the network to coordinate the activity, the at least two nodes belonging to a peer-to-peer rendez-vous system; and
   splitting a responsibility for coordinating the monitoring activity of the monitoring probes between the at least two nodes according to a compressed representation of flow parameter keys, wherein
   upon detection of a new flow at least one probe computes a hash value of one or more certain fields of the flow identifying the flow,
   the hash is the flow 5-tuple consisting of IP source and destination addresses, protocol type, and source and destination ports,
   after having computed the hash value, the at least one probe performs a content-based lookup of the computed hash value for obtaining the address of the responsible node which will be responsible for coordinating the monitoring of the flow, and
   after having obtained the address of the responsible node, the at least one probe sends a message to the responsible node including definable data types of the flow and/or a description of the flow,
   wherein transparent handling of node failures and new node joins is used within the network.

15. The method according to claim 14, wherein
   the at least two monitoring probes do not belong to the peer-to-peer rendez-vous system but the probes are adapted to be connected to the peer-to-peer rendez-vous system, or
   the at least two monitoring probes belong to the peer-to-peer rendez-vous system.

16. The method according to claim 14, wherein there is no centralized coordination point, responsibility of monitoring specific traffic is assigned to a single probe so that all flows going through the probes are monitored only once, and no duplicate reports or messages associated with the same flow are exported by the probes unless explicitly required.

* * * * *